United States Patent
Lee et al.

(10) Patent No.: US 7,999,796 B2
(45) Date of Patent: Aug. 16, 2011

(54) TOUCH PANEL WITH LIGHT-SENSITIVE AND PRESSURE-SENSITIVE PIXELS

(75) Inventors: Hsin-Hung Lee, Hsin-Chu (TW);
Po-Yuan Liu, Hsin-Chu (TW);
Min-Feng Chiang, Hsin-Chu (TW);
Chun-Hsin Liu, Hsin-chu (TW);
Chi-Wen Chen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 878 days.

(21) Appl. No.: 11/934,784

(22) Filed: Nov. 5, 2007

(65) Prior Publication Data
US 2009/0027350 A1    Jan. 29, 2009

(30) Foreign Application Priority Data
Jul. 26, 2007    (TW) .................................. 96127317 A

(51) Int. Cl.
*G06F 3/045* (2006.01)
(52) U.S. Cl. ........................................ 345/174; 345/175
(58) Field of Classification Search ........... 345/173–176
See application file for complete search history.

(56) References Cited

U.S. PATENT DOCUMENTS

| | | | | |
|---|---|---|---|---|
| 7,020,270 | B1 * | 3/2006 | Ghassabian | 379/368 |
| 7,432,991 | B1 * | 10/2008 | Chang et al. | 348/739 |
| 7,742,041 | B2 * | 6/2010 | Lee et al. | 345/173 |
| 2005/0264535 | A1 * | 12/2005 | Johnson et al. | 345/173 |
| 2006/0077186 | A1 * | 4/2006 | Park et al. | 345/173 |
| 2006/0097975 | A1 | 5/2006 | Lee | |
| 2007/0176905 | A1 * | 8/2007 | Shih et al. | 345/173 |
| 2007/0200832 | A1 * | 8/2007 | Cho et al. | 345/173 |

FOREIGN PATENT DOCUMENTS
TW    200723215    6/2007
* cited by examiner

*Primary Examiner* — Chanh Nguyen
*Assistant Examiner* — Kwang-Su Yang
(74) *Attorney, Agent, or Firm* — Winston Hsu; Scott Margo

(57) ABSTRACT

A touch panel includes a plurality of pixels. Each pixel includes a light sensing component, a pressure sensing component, and a switch. The light sensing component generates a first sensing signal when sensing light. The pressure sensing component generates a second sensing signal when sensing pressure. The switch transmits the first and the second sensing signals when receiving a gate driving signal.

7 Claims, 5 Drawing Sheets

TOUCH PANEL WITH LIGHT-SENSITIVE AND PRESSURE-SENSITIVE PIXELS

BACKGROUND OF THE INVENTION

1. Field of the Invention

The present invention relates to a touch panel, and more particularly, to a touch panel with pixels wherein each pixel has light sensing components and pressure sensing components.

2. Description of the Prior Art

Please refer to FIG. 1. FIG. 1 is a diagram illustrating a pixel Pa of a conventional touch panel. As shown in FIG. 1, the pixel Pa comprises a switch SW and a photo sensing component PT. The switch SW can be realized with a Thin Film Transistor (TFT). The light sensing component PT can be realized with a photo transistor or photo diode. One end of the light sensing component PT is coupled to the second end of the switch SW, and the other end of the light sensing component PT is coupled to a bias voltage source Vb. When the light sensing component PT senses light, which means the pixel Pa is not touched, the current I is generated and pulls down the voltage Va to voltage Vb. On the other hand, when the light sensing component does not sense light, which means the pixel Pa is touched, the current I is not generated and the voltage Va keeps at the same level. The control end of the switch SW is coupled to the corresponding gate line of the pixel Pa, and the first end of the switch SW is coupled to the corresponding data reading line of the pixel Pa, whereas the second end of the switch SW is coupled to one end of the light sensing component. The switch SW couples the first end of the switch SW to the second end of the switch SW when receiving the gate driving signal from the corresponding gate line, and thus the corresponding data reading line of the pixel Pa receives the voltage Va. In this way, the conventional touch panel determines if the pixel Pa is touched according to the level of the voltage Va.

However, the drawback of the conventional touch panel is that when there is no ambient light around the conventional touch panel, the light sensing component PT can not sense the variation of light. Hence the conventional touch panel can not determine if the pixel Pa is touched. In this situation, the application of the conventional touch panel is limited.

SUMMARY OF THE INVENTION

The present invention provides a touch panel. The touch panel comprises a plurality of pixels. Each pixel comprises a light sensing component for sensing light then generating a first sensing signal, a pressure sensing component for sensing pressure then generating a second sensing signal, and a switch. The switch comprises a first end coupled to the light sensing component and the pressure sensing component, a control end for receiving a gate driving signal, and a second end for transmitting the first sensing signal and the second sensing signal according to the gate driving signal.

The present invention further provides a touch panel. The touch panel comprises a plurality of first pixels and second pixels. Each first pixel comprises a light sensing component for sensing light then generating a first sensing signal and a switch. The switch comprises a first end coupled to the light sensing component, a control end for receiving a first gate driving signal, and a second end for transmitting the first sensing signal according to the first gate driving signal. Each second pixel comprises a pressure sensing component for sensing pressure then generating a second sensing signal and a switch. The switch comprises a first end coupled to the pressure sensing component, a control end for receiving a second gate driving signal, and a second end for transmitting the second sensing signal according to the second gate driving signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
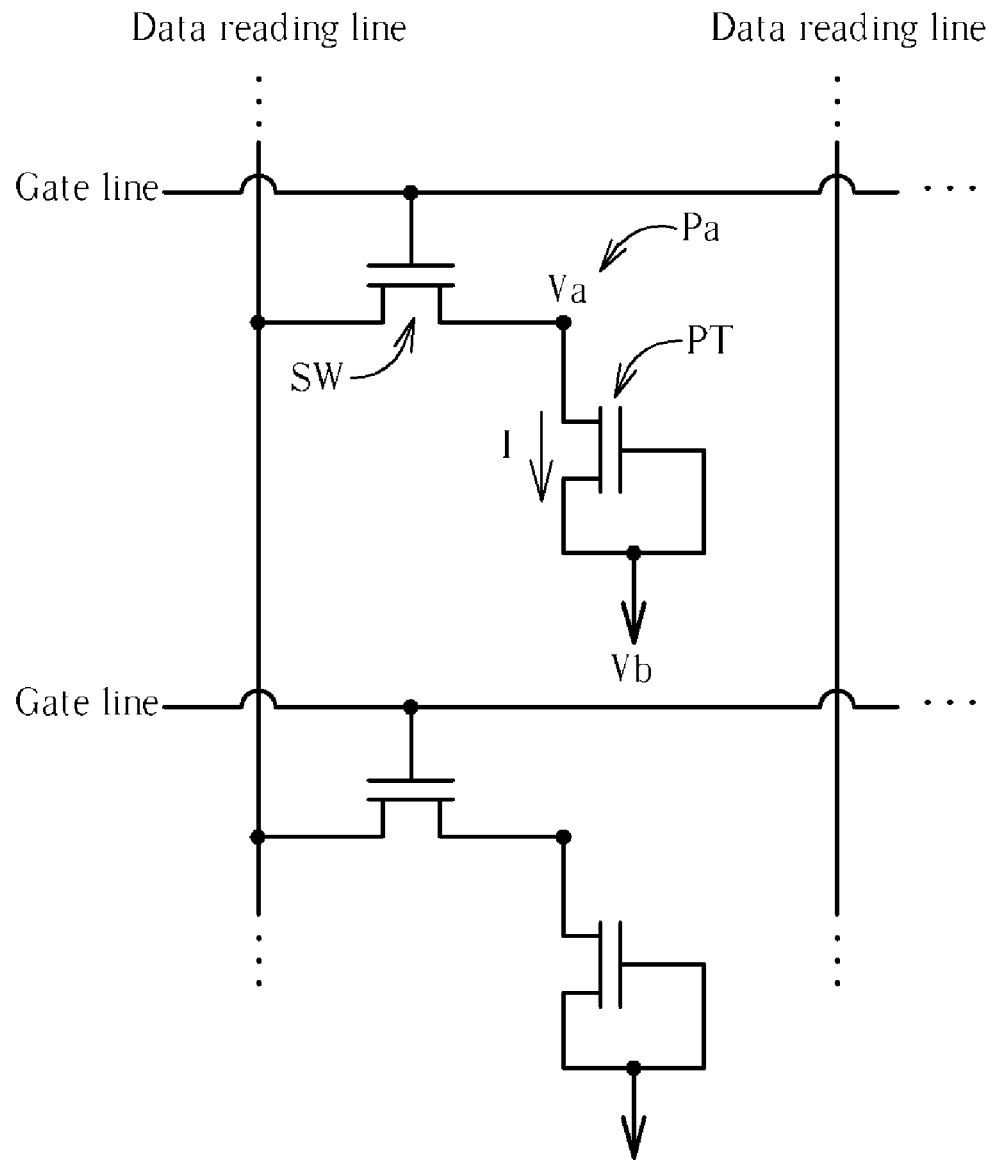
FIG. 1 is a diagram illustrating a pixel of a conventional touch panel.
Figure 2:
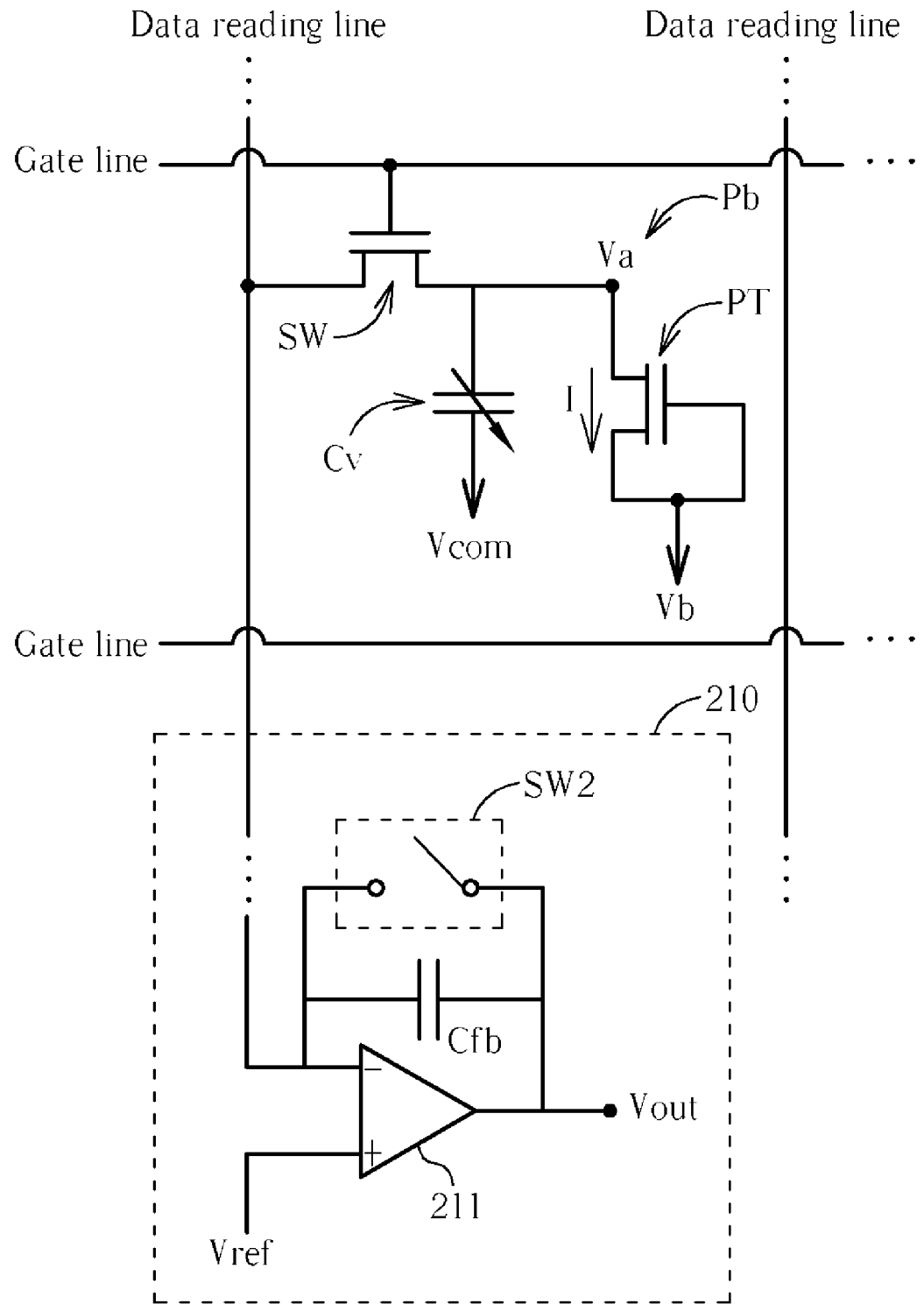
FIG. 2 is a diagram illustrating a pixel of the touch panel of the present invention.

Please refer to FIG. 2. FIG. 2 is a diagram illustrating a pixel Pb of the touch panel of the present invention. As shown in FIG. 2, the pixel Pb is similar to the pixel Pa and the description of the same components is omitted. The difference between the pixel Pa and Pb is that the pixel Pb further comprises a variable capacitor Cv coupled to the second end of the switch SW. One end of the variable capacitor Cv is coupled to the second end of the switch SW, and the other end of the variable capacitor Cv is coupled to a common end Vcom (the common end carries a voltage). When the pixel Pb is touched, the capacitance of the variable capacitor Cv is changed, and consequently the voltage Va is affected. In this way, when the pixel Pb is not touched, the light sensing component PT generates the current I to change the level of the voltage Va; when the pixel Pb is touched, the light sensing component PT does not generate the current but the capacitance of the variable capacitor Cv is changed so that the level of the voltage Va is also changed. In other word, the pixel Pb can determine if touched whether there is ambient light or not.

Additionally, in FIG. 2, at the corresponding data reading line of the pixel Pb, an integrator 210 (detecting circuit) is coupled for detecting if the pixel Pb is touched. The integrator 210 comprises a switch SW2, a capacitor Cfb, and an amplifier 211. The positive input end of the amplifier 211 is coupled to a reference voltage source for receiving a reference voltage Vref. The negative input end of the amplifier 211 is coupled to the corresponding data reading line. The output end of the amplifier 211 is disposed for outputting an output voltage Vout. The switch SW2 is coupled between the negative input end and the output end of the amplifier 211. The capacitor Cfb is coupled between the negative input end and the output end of the amplifier 211. When the pixel Pb receives the corresponding gate driving signal, the switch is turned off (disconnected). When the pixel Pb does not receive the corresponding gate driving signal, the switch is turned on (connected) so that the negative input end of the amplifier 211 is coupled to the output end of the amplifier 211.

When the capacitor Cv is not touched (that is, not pressed), it has a capacitance value of Cst1; when the capacitor Cv is touched (pressed), the capacitance value is Cst2. The charge maximum Q(max) of the variable capacitor Cv can store is: Q(max)=Cst1(Vref−Vcom). The maximum output voltage Vout(max) is: Vout(max)=Cst1(Vref−Vcom)/Cfb. When the pixel Pb is not touched, which means the light sensing component PT senses light, the output voltage of the integrator 210 is:

$$Vout = Cst1(Va(t)Vcom)/Cfb = \int_{0}^{0-Tf} I(t)dt/Cfb \approx I \times Tf/Cfb,$$

wherein Va(t) designates the voltage Va, Tf designates a timeframe, and I designates the current generated by the photo transistor PT. When the pixel Pb is touched, which means the light sensing component PT senses no light, the output voltage of the integrator 210 is: Vout=(Cst2−Cst1)(Vcom−Vref)/Cfb. From the two expressions described above, it is understood that the output voltage of the integrator 210 differs between the pixel Pb being touched and the pixel Pb being not touched. Therefore the pixel Pb can be efficiently determined that it is touched or not.

Figure 3:
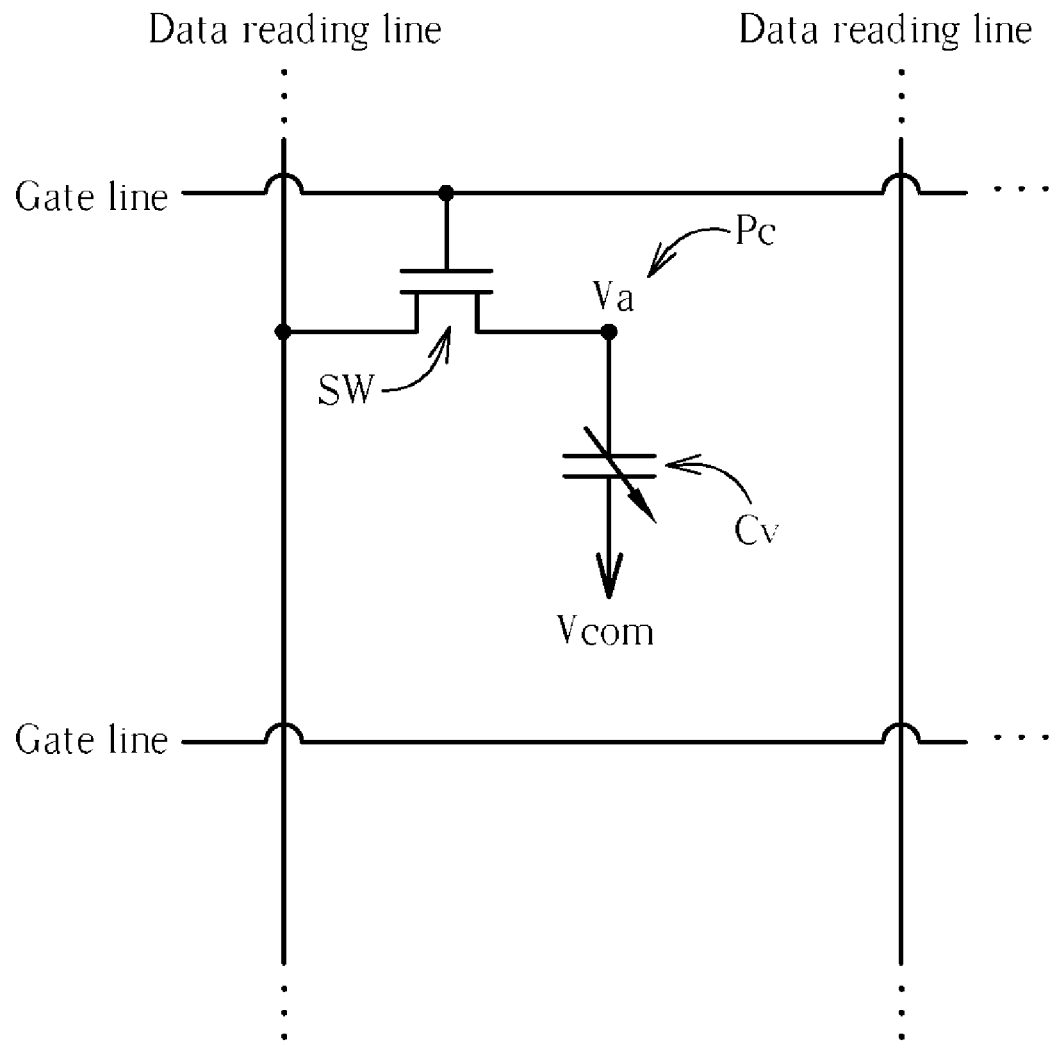
FIG. 3 is another pixel of the present invention.

Please refer to FIG. 3. FIG. 3 is another embodiment of the present invention. The pixel Pc is similar to pixel Pb, and the difference between the pixels Pc and Pb is that pixel Pc does not comprise a light sensing component PT. In this way, the pixel Pc can determine if it is touched directly according to a capacitance change of the variable capacitor Cv, which saves the expense of the light sensing component PT.

Figure 4:
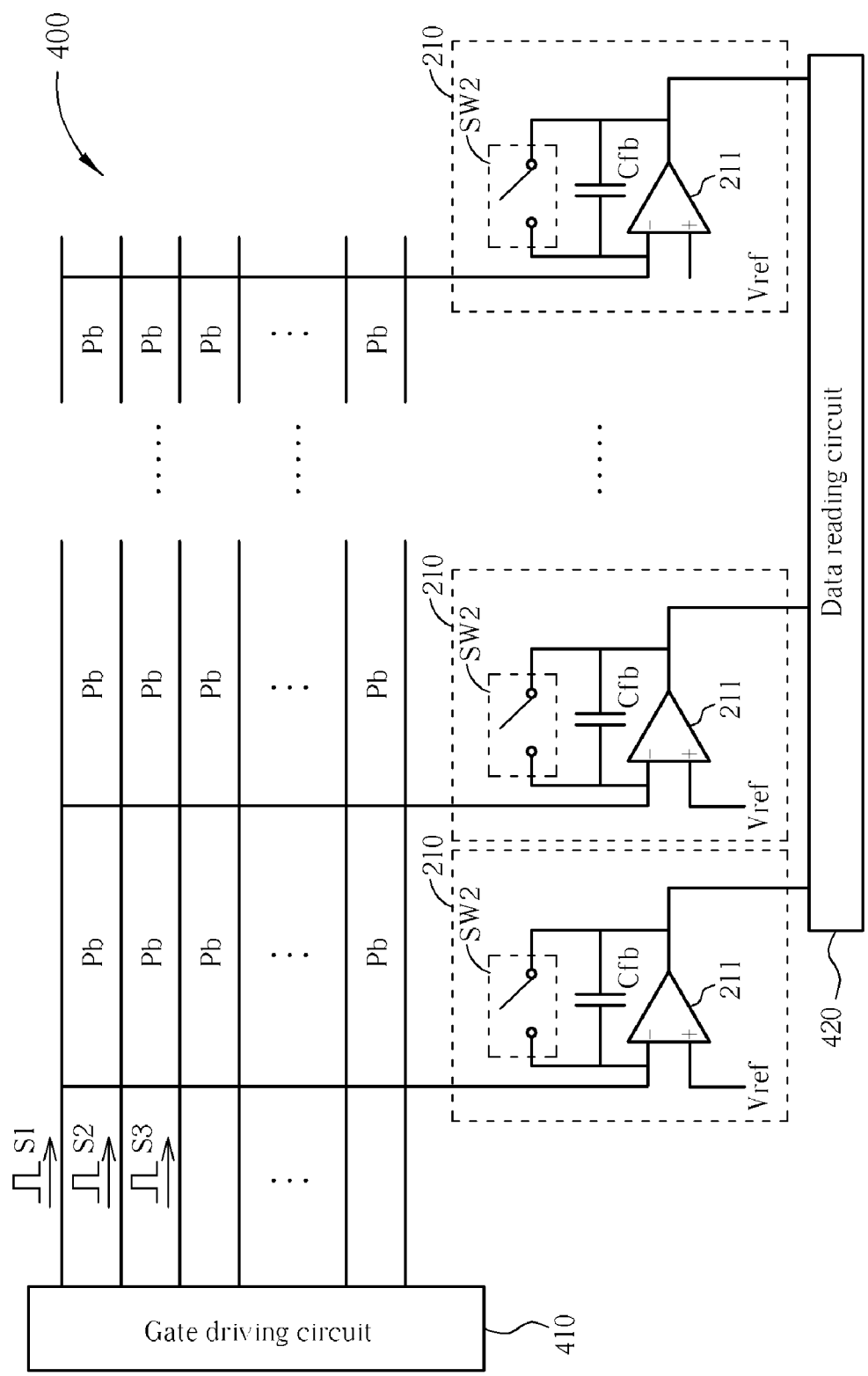
FIG. 4 is a touch panel according to a first embodiment of the present invention.

Please refer to FIG. 4. FIG. 4 is a touch panel 400 according to a first embodiment of the present invention. As shown in FIG. 4, the touch panel 400 comprises a gate driving circuit 410, a data reading circuit 420, a plurality of integrators (detecting circuits) 210, and a plurality of pixels Pb. The gate driving circuit 410 transmits the gate driving signals S1, S2, S3, and so on, to the corresponding pixels. The data reading circuit 420 detects if the corresponding pixels are touched according to the respective gate driving signal. In this way, the touch panel 400 can efficiently determine the touched pixels, increasing the utility and convenience.

Figure 5:
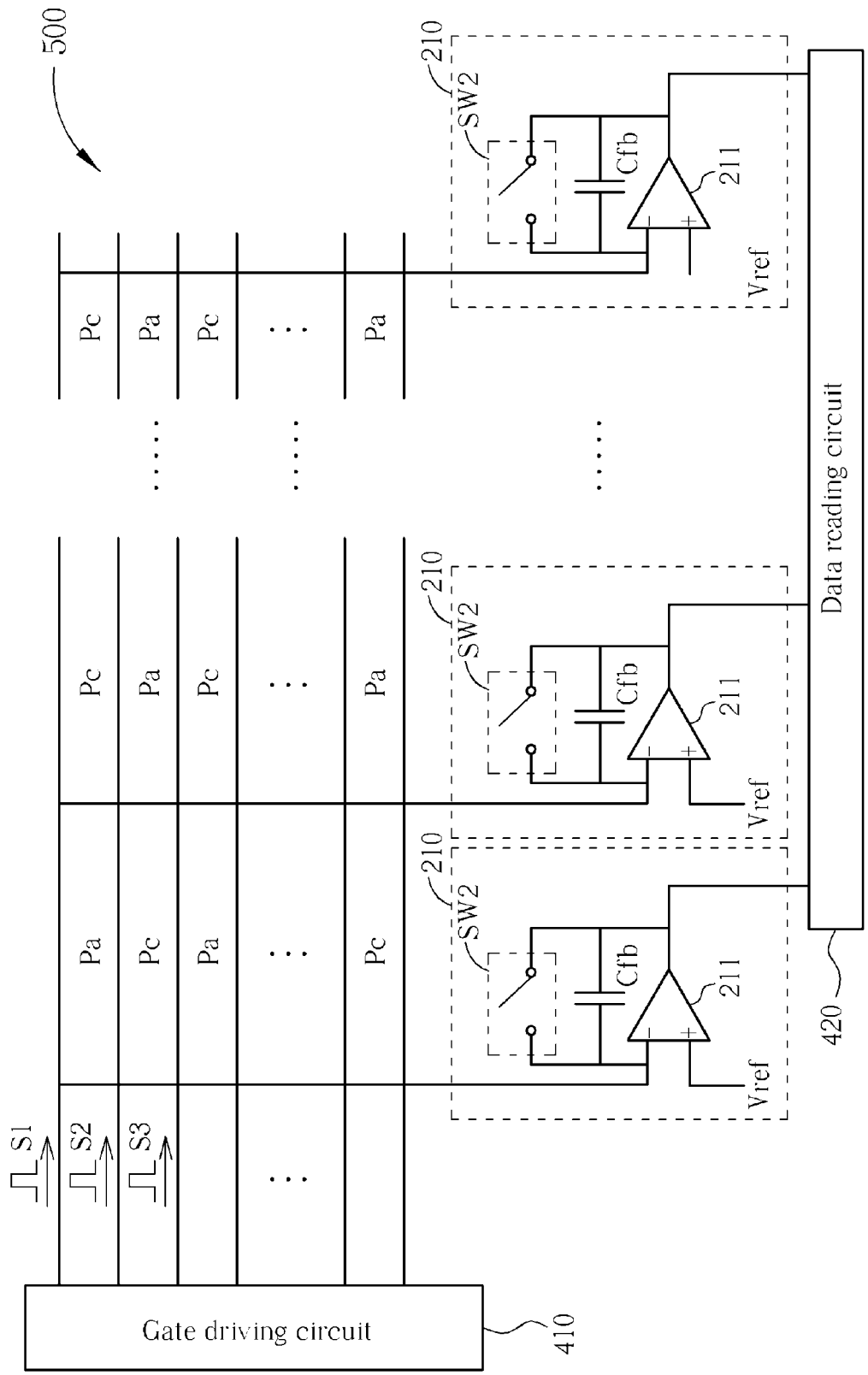
FIG. 5 is a touch panel according to a second embodiment of the present invention.

Please refer to FIG. 5. FIG. 5 is a touch panel 500 according to the second embodiment of the present invention. As shown in FIG. 5, the touch panel 500 comprises a gate driving circuit 410, a data reading circuit 420, a plurality of integrator 210, and a plurality of pixels Pa and Pc. The gate driving circuit 410 transmits the gate driving signals S1, S2, S3, and so on, respectively to the corresponding pixels. The data reading circuit 420 detects if the corresponding pixels are touched according to the corresponding gate driving signal. In this way, the touch panel 500 can efficiently determine the touched pixels, increasing the utility and convenience of the touch panel.

Those skilled in the art will readily observe that numerous modifications and alterations of the device and method may be made.

What is claimed is:

1. A touch panel comprising:
   a plurality of pixels, each pixel comprising:
   a light sensing component for sensing light and then generating a first sensing signal;
   a pressure sensing component for sensing pressure and then generating a second sensing signal, the pressure sensing component comprising a variable capacitor including:
      a first end; and
      a second end for receiving a second voltage,
      wherein capacitance of the variable capacitor changes when the variable capacitor is pressed; and
   a switch, comprising:
      a first end coupled to the light sensing component and directly connected to the first end of the variable capacitor;
      a control end for receiving a gate driving signal; and
      a second end for transmitting the first sensing signal and the second sensing signal according to the gate driving signal.

2. The touch panel of claim 1, further comprising a plurality of gate lines for transmitting a plurality of gate driving signals to the switches of the plurality of pixels.

3. The touch panel of claim 1, further comprising a plurality of data reading lines, each of the data reading lines coupled to the second ends of the switches of corresponding pixels for transmitting the first sensing signals and the second sensing signals.

4. The touch panel of claim 1, wherein the light sensing component comprises:
   a photo transistor including:
      a first end for receiving a first voltage;
      a control end coupled to the first end of the photo transistor; and
      a second end coupled to the first end of the corresponding switch.

5. The touch panel of claim 1, further comprising a plurality of detecting circuits for receiving the first sensing signals and the second sensing signals transmitted from the plurality of data reading lines.

6. The touch panel of claim 5, wherein each of the detecting circuits comprises:
   an amplifier, comprising:
      a positive input end for receiving a reference voltage;
      a negative input end coupled to one of the plurality of data reading lines; and
      an output end for outputting an output voltage according to a corresponding first sensing signal and a corresponding second sensing signal;
   a capacitor coupled between the output end of the amplifier and the negative input end of the amplifier; and
   a switch coupled between the output end of the amplifier and the negative input end of the amplifier for coupling the output end of the amplifier to the negative input end of the amplifier when a corresponding pixel does not receive the gate driving signal.

7. The touch panel of claim 4, wherein the first end of the variable capacitor is directly connected to the second end of the photo transistor and is not directly connected to the control end of the photo transistor.

* * * * *